United States Patent [19]
Dolejs

[11] Patent Number: 4,614,204
[45] Date of Patent: Sep. 30, 1986

[54] ROTARY VALVE FOR INTERCONNECTING CONDUITS IN THREE GROUPS

[75] Inventor: Charles A. Dolejs, Arlington Heights, Ill.

[73] Assignee: UOP Inc., Des Plaines, Ill.

[21] Appl. No.: 679,779

[22] Filed: Dec. 10, 1984

[51] Int. Cl.$^4$ .................... F16K 11/074; B01D 15/02
[52] U.S. Cl. .......................... 137/625.11; 137/625.15; 137/625.46
[58] Field of Search ...................... 137/625.11, 625.12, 137/625.15, 625.13, 625.46

[56] References Cited

U.S. PATENT DOCUMENTS

| | | | |
|---|---|---|---|
| 2,985,589 | 5/1961 | Broughton et al. | 210/34 |
| 3,040,777 | 6/1962 | Carson et al. | 137/625.15 |
| 3,192,954 | 7/1965 | Gerhold et al. | 137/625.11 |
| 3,223,123 | 12/1965 | Young | 137/625.46 |
| 3,422,848 | 1/1969 | Liebman et al. | 137/625.15 |
| 3,451,428 | 6/1969 | Pruett | 137/625.46 |
| 3,460,574 | 8/1969 | Risher | 137/625.46 |
| 3,477,207 | 11/1969 | Auger | 137/625.46 |
| 3,747,630 | 7/1973 | Hurrell | 137/625.46 |
| 4,402,832 | 9/1983 | Gerhold | 210/659 |

Primary Examiner—Alan Cohan
Assistant Examiner—John A. Rivell
Attorney, Agent, or Firm—Thomas K. McBride; John F. Spears, Jr.; Richard J. Cordovano

[57] ABSTRACT

A unitary multiport rotary disc valve capable of accomplishing the simultaneous interconnection of a plurality of conduits in accordance with a previously determined cycle, where any conduit communicates with no more than one other conduit at any one valve index position. It is particularly useful where such plurality of conduits may be divided into three separate groups according to their function and it is necessary to interconnect the conduits in accordance with a relationship among the groups. The conduits to be interconnected are attached to the bottom of a discoid stationary body, or stator, having channels in it which communicate between the conduits and flow paths in a discoid rotating body, or rotor, which assumes various positions according to the cycle steps and distributes fluid flowing in the conduits in a different manner in each cycle step. The stator has two rows of ports which are arranged in two concentric circles in addition to a number of fluid-containing grooves extending circumferentially 360° around the stator.

5 Claims, 5 Drawing Figures

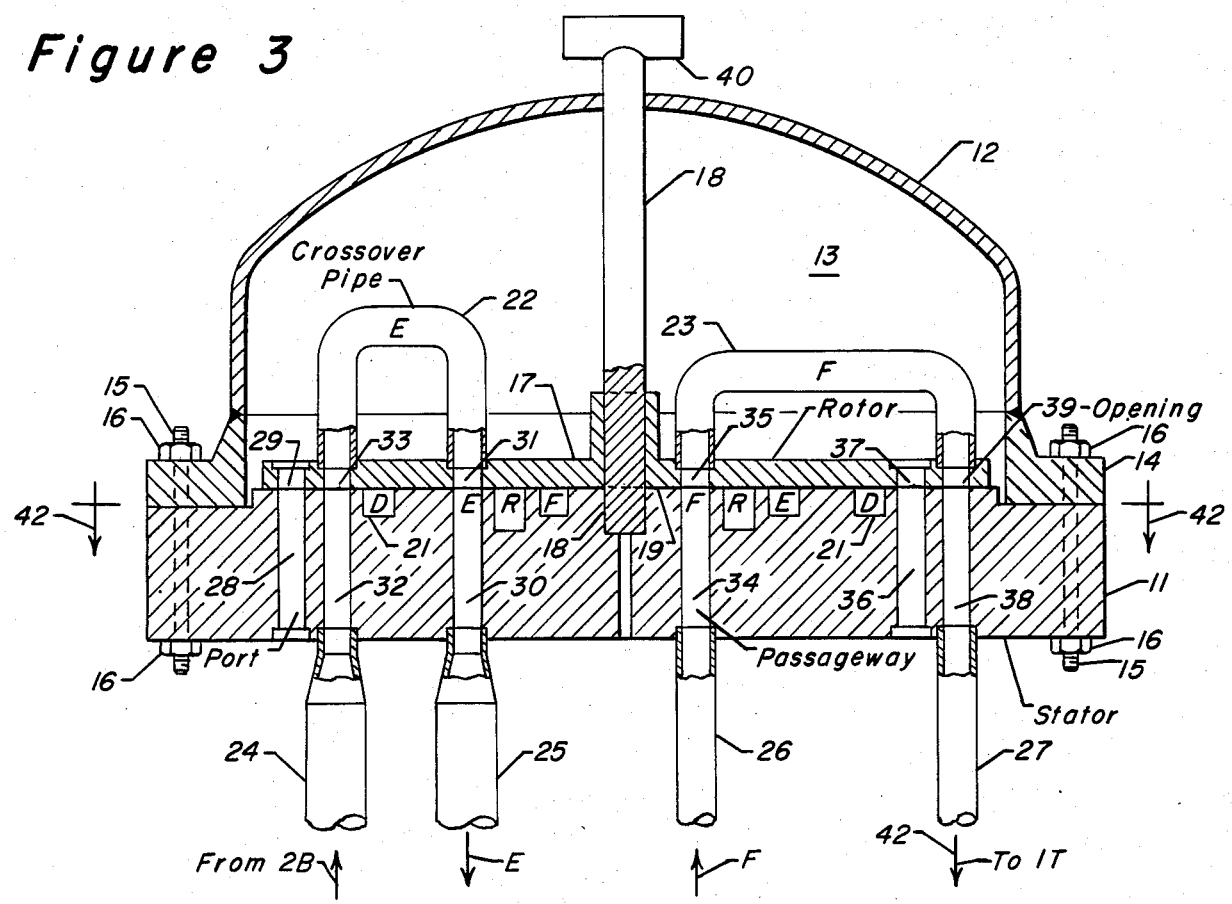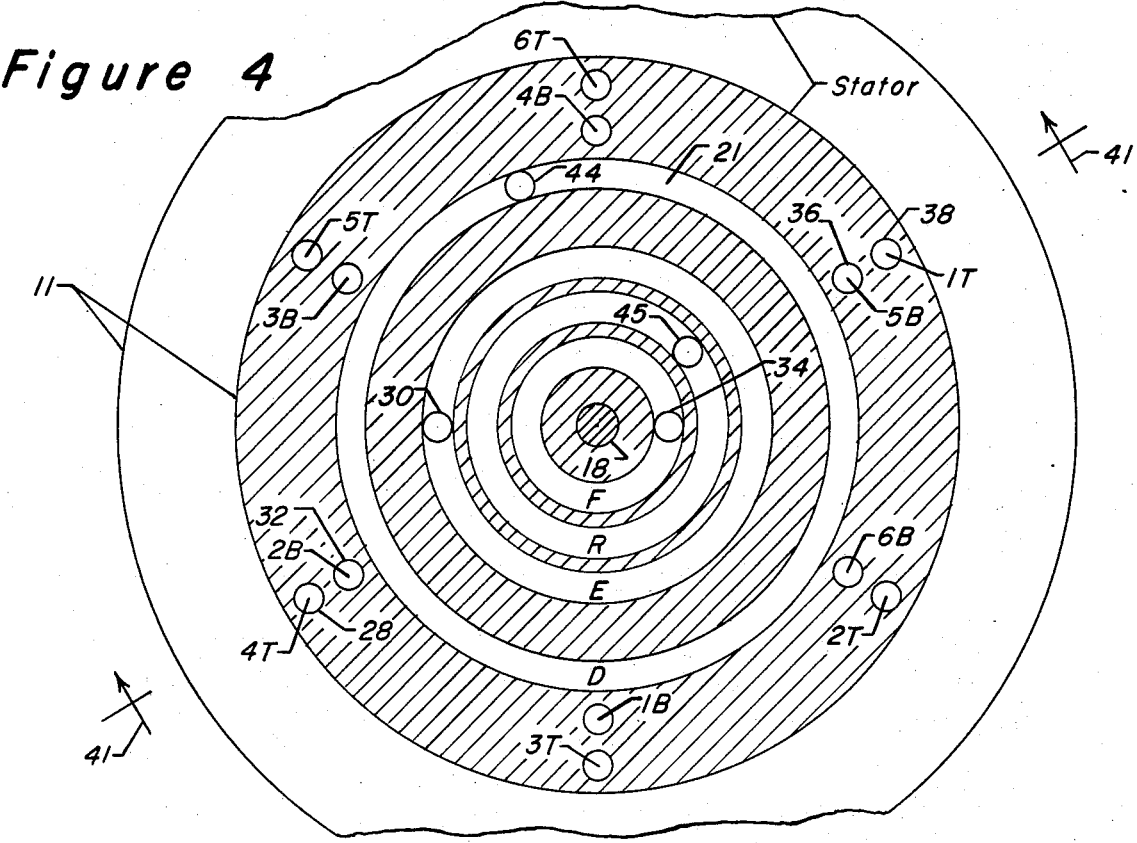

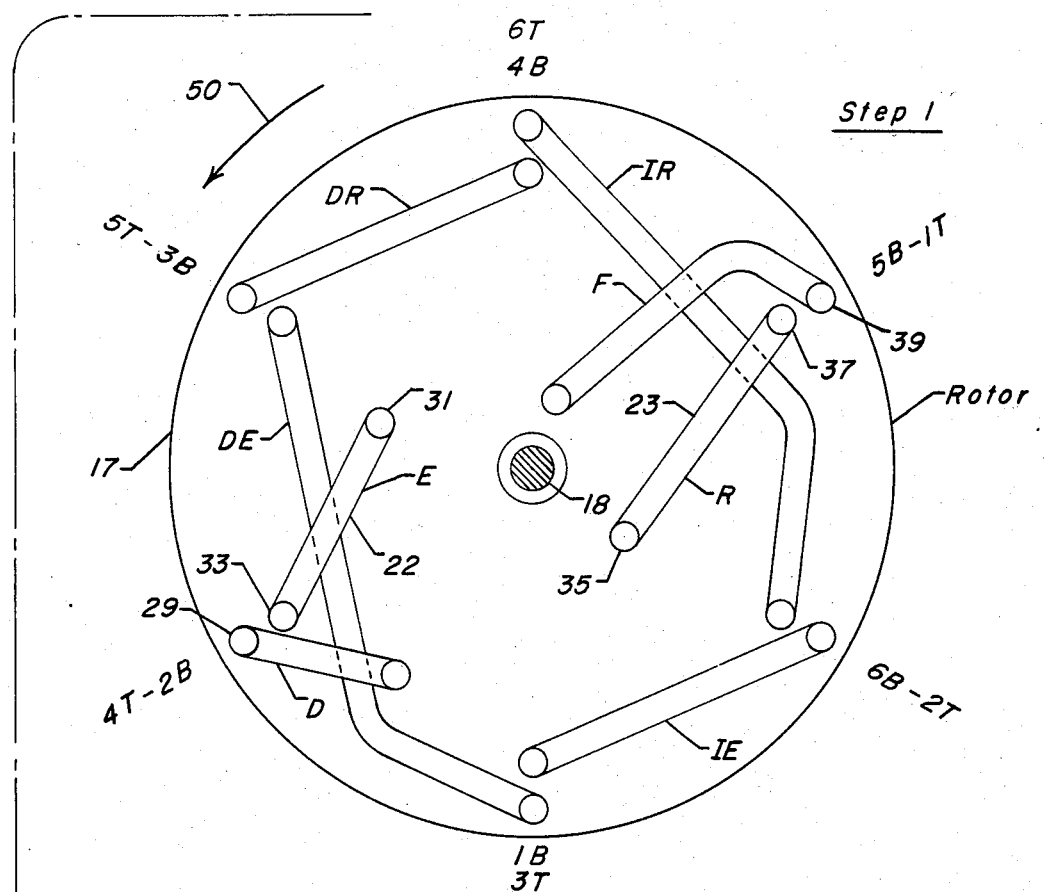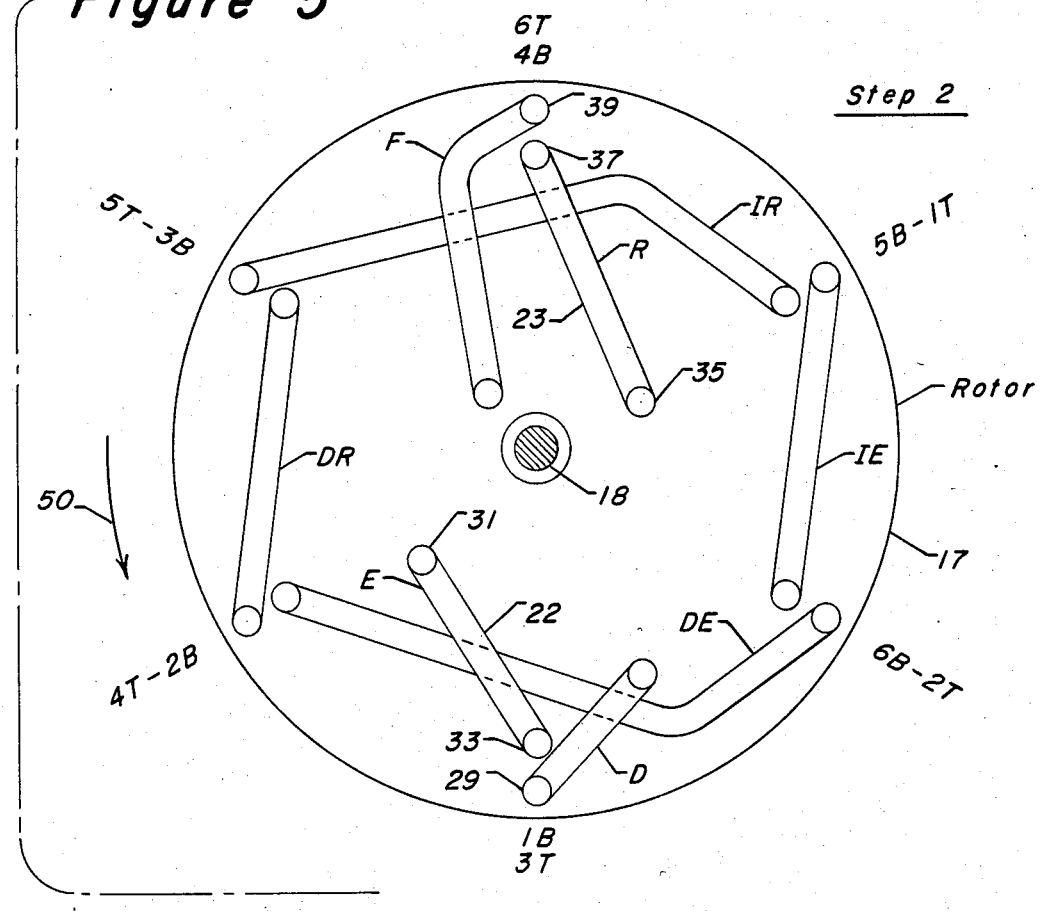
Figure 5

ROTARY VALVE FOR INTERCONNECTING CONDUITS IN THREE GROUPS

FIELD OF THE INVENTION

This invention relates to the art of multiport rotary disc valves. More particularly, it relates to such valves which are capable of accomplishing the simultaneous interconnection of a plurality of conduits in accordance with a predetermined periodic sequence. Further, it deals with such valves which are useful where such plurality of conduits may be divided into three separate groups according to their function and it is desired to interconnect the conduits in accordance with a relationship among the groups.

INFORMATION DISCLOSURE

Multiport rotary disc valves are the subjects of U.S. Pat. Nos. 3,040,777 (Carson et al.) and 3,422,848 (Liebman et al.); these are believed to be the most relevant references. The teachings of these patents are hereby incorporated in full into this document. A preferred embodiment of the invention of these patents is where the grooves or tracks are contained within the stator and piping is used to communicate between rotor openings. This embodiment has been used in practicing the process of U.S. Pat. No. 2,985,589 (Broughton et al.), which is described herein and other similar processes. However, in the practice of a process such as disclosed in U.S. Pat. No. 4,402,832 (Gerhold), which is described below, the valve of these references cannot be utilized. A valve having utility similar to the multiport rotary disc valve of Carson and Liebman et al. is disclosed in U.S. Pat. No. 3,192,954 (Gerhold et al.).

BRIEF SUMMARY OF THE INVENTION

This invention relates to a unitary multiport rotary disc valve useful in transferring a plurality of different fluid streams among different locations in accordance with a previously determined cycle. The fluid streams are contained in conduits which are interconnected by means of the valve. Any conduit communicates with no more than one other conduit at any one cycle step, or valve index position. The conduits to be interconnected are attached to the bottom of a stationary body, or stator, having channels in it which communicate between the conduits and flow paths in a rotating body, or rotor, which assumes various positions according to the cycle steps and distributes fluid flowing in the conduits in a different manner in each cycle step.

There are many instances in which it is necessary to route a fluid stream to one location for a period of time, then to another location for a period of time, and so forth for multiple locations. This relatively simple problem of routing a single fluid stream to various destinations in a previously determined cycle or periodic sequence is easily accomplished with one or more devices such as a multiport rotary plug valve. When it is necessary to simultaneously route more than a single fluid stream to various destinations, it is highly desirable to use a single device rather than numerous individual valves, as discussed in the above-mentioned Carson U.S. Pat. No. 3,040,777. A multiport rotary disc valve is such a device.

It is among the objects of this invention to provide unitary mechanical valve apparatus for simultaneously accomplishing the interconnection of a plurality of conduits in accordance with a previously determined cycle, where any conduit communicates with no more than one other conduit at any one valve index position. A broad embodiment is a valve comprising: (a) a discoid stator having the plurality of conduits connected to it, having a substantially flat seating surface, which seating surface comprises a portion of an interface region, which interface region has a plurality of grooves located concentrically about an axis of rotation, the stator further having a plurality of ports disposed in two circular rows around the axis of rotation and extending through the stator from the stator seating surface to another surface of the stator in order to communicate with a conduit, and having a plurality of passageways, each extending from a groove through the stator to communicate with a conduit; (b) a discoid rotor having a seating surface which is in fluid-tight contact with the stator seating surface, which rotor seating surface comprises a portion of the interface region, and which rotor has a plurality of openings, each opening extending through the rotor to communicate with either a port or a groove; and (c) a plurality of crossover pipes connected to the rotor at locations other than at the rotor seating surface, each crossover pipe communicating between two openings in order to provide fluid communication between a groove and a port or between a port in one of the circular rows and a port in the other of the circular rows.

It is a further object of the invention to provide a valve suitable for use when the plurality of conduits may be divided into a first, a second, and a third group of conduits. Such a valve comprises: (a) a discoid stator having a substantially flat seating surface, which seating surface comprises a portion of an interface region, which interface region has a plurality of grooves, the stator further having a plurality of ports and a plurality of passageways, where (i) the ports are disposed around an axis of rotation and divided into a first and a second group of ports, each port extending through the stator from the stator seating surface to another surface of the stator in order to communicate with a conduit which is in a corresponding group of conduits, and the number of ports is equal to the number of the conduits in the first and second groups of conduits, (ii) the grooves in the interface region are circular in form, are concentric, and are centered on the axis of rotation, (iii) the passageways are equal in number to the number of grooves, each passageway extending from a groove through the stator to communicate with a conduit of the third group of conduits; (b) a discoid rotor having a seating surface which is in fluid-tight contact with the stator seating surface, which rotor seating surface comprises a portion of the interface region, which interface region also is comprised of portions of the rotor and the stator which are adjacent to the seating surfaces, which rotor rotates about the axis of rotation to various valve index positions in accordance with the previously determined cycle, where the axis passes through the center of both the rotor and stator and is normal to the seating surfaces, and which rotor has a plurality of openings, each opening extending through the rotor to communicate with either a port or a groove, the number of openings being equal to the total number of conduits, the openings being divided into a first, a second, and a third set and disposed about the axis of rotation such that in each index position, each port of the first group in the stator is in register with a different one of the openings of the first set of rotor openings, each port of the second group in the stator is in register with a different one of the openings of the second set of rotor openings, and such that in every index position each of the grooves is in constant communication with a particular opening of the third set of rotor openings; and (c) a plurality of crossover pipes connected to the rotor, each crossover pipe communicating between two openings in order to complete fluid transfer paths between conduits of the first and second groups, conduits of the first and third groups, and conduits of the second and third groups in accordance with the previously determined cycle, where that part of a fluid transfer path between a conduit and a crossover pipe comprises, for the first and second groups of conduits, a port and an opening, and comprises, for the third group of conduits, a passageway, a groove, and an opening.

BRIEF DESCRIPTION OF THE DRAWINGS

FIG. 3 is a sectional elevation view of a typical multiport rotary disc valve embodying the invention. Certain details of the valve have been omitted from the drawing as unnecessary to the complete description of the present invention. Sectional arrows 41 showing how the elevation is taken are shown in FIG. 4. The rotor position shown in FIG. 3 corresponds to cycle step 1, described herein.

FIG. 4 is a top view, in schematic form, of the stator portion of the valve of FIG. 3, with the rotor and dome removed. The outer portion of the stator which includes the bolt circle is shown with nuts and studs omitted. Sectional arrows 42 of FIG. 3 show the orientation of the drawing with respect to FIG. 3.

FIG. 5 is a schematic representation of the rotor of the valve of FIG. 3 as seen from the top (without the top head of the valve in place). It is depicted in two different angular positions corresponding to the two steps depicted in FIG. 1.

BACKGROUND OF THE INVENTION

Figure 1:
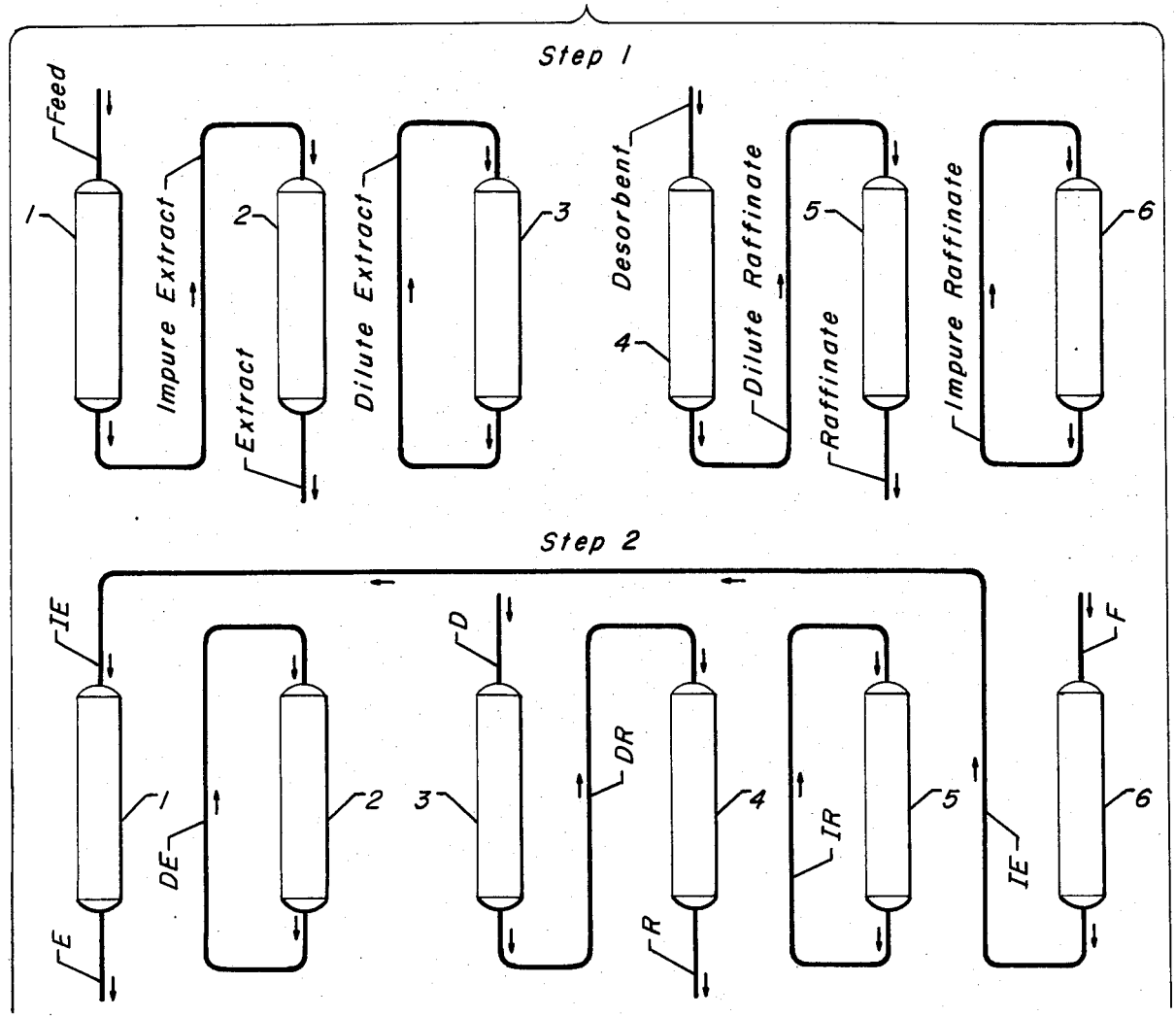
FIG. 1 depicts in schematic form six separation zones, or units, with two different fluid flow arrangements, where each arrangement is that associated with a single step of the process of U.S. Pat. No. 4,402,832 (Gerhold).

The separation of various substances through selective absorption using a simulated moving bed of adsorbent is an example of a process in which a multiport rotary disc valve is useful. Simulation of a moving adsorbent bed is described in U.S. Pat. No. 2,985,589 (Broughton et al.), which is mentioned above. In accomplishing this simulation, it is necessary to connect a feed stream to a series of beds in sequence, first to bed No. 1, then to bed No. 2, and so forth for numerous beds, the number of beds often being between 12 and 24. These beds may be considered to be portions of a single large bed whose movement is simulated. Each time the feed stream destination is changed, it is also necessary to change the destinations (or origins) of at least three other streams, which may be streams entering the beds, such as the feed stream, or leaving the beds. The moving bed simulation may be simply described as dividing the bed into a series of fixed beds and moving the points of introducing and withdrawing liquid streams past the series of fixed beds instead of moving the beds past the introduction and withdrawal points. A rotary valve used in the Broughton process may be described as accomplishing the simultaneous interconnection of two separate groups of conduits.

There are many different process requirements in moving bed simulation processes, resulting in different flow schemes and thus variations in rotary valve arrangement. For example, in addition to the four basic streams described in Broughton (U.S. Pat. No. 2,985,589), it may be desirable to utilize one or more streams to purge, or flush, a pipeline or pipelines. A flush stream is used to prevent undesirable mixing of components. The flush substance is chosen to be one which is not undesirable for mixing with either main stream, that being purged or that which enters the pipeline after flushing is completed. U.S. Pat. No. 3,201,491 (Stine et al.) may be consulted for information on flushing lines as applied to the process of Broughton (U.S. Pat. No. 2,985,589). It may be desirable to pass fluid through a bed or beds in the reverse direction from normal flow. This is commonly known as backflushing, a subject treated in U.S. Pat. No. 4,319,929 (Fickel). Other applications for various arrangements of multiport rotary disc valves may be seen in U.S. Pat. No. 4,313,015 (Broughton); U.S. Pat. No. 4,157,267 (Odawara et al.); U.S. Pat. No. 4,182,633 (Ishikawa et al.); and U.S. Pat. No. 4,409,033 (LeRoy).

While the multiport rotary disc valve of Carson (U.S. Pat. No. 3,040,777) provided a satisfactory valve design for the simultaneous interconnection of two independent groups of conduits such that each conduit of the first group could be brought into individual communication with every conduit of the second group, it is not suitable when three groups of conduits must be simultaneously interconnected in the same manner. Upon reference to Broughton (U.S. Pat. No. 2,985,589), it can be seen that there are only two groups of conduits which need to be interconnected when the arrangement of the drawing of that patent is utilized. One group consists of the conduits which provide the flows entering and leaving the simulated moving bed adsorbent system, that is, the flows which are switched among the beds, such as the feed stream. A second group consists of the conduits associated with the individual beds, that is, which supply and remove fluid from the beds, one conduit being connected between each two beds. It is to be noted that each conduit of the second group serves that dual function of supply and removal, so that it is unnecessary to provide conduits for supplying fluid separate from those for removing fluid.

When it is necessary to simultaneously interconnect conduits of three different groups of conduits in accordance with a previously determined cycle, the apparatus of the present invention may be used. An example of a process involving three conduit groups may be found in U.S. Pat. No. 4,402,832 (Gerhold), which is described below. As mentioned above, it is highly desirable to use a single device to do so, thereby avoiding the obvious problems associated with numerous separate valves which must be simultaneously actuated.

In the valves of Carson and Liebman, mentioned above, each of the rotor pipes contains one particular stream at all times. One end of each rotor pipe is always in communication with a particular track. In the present invention, only a portion of the crossover pipes are dedicated to a single stream. The prior art valves do not require any particular symmetrical pattern of passageways. In the present invention, it is necessary that the ports and openings be arranged in a symmetrical manner in two circles, as described herein.

DETAILED DESCRIPTION OF THE INVENTION

Following is a description of the embodiment of the invention shown in FIGS. 1 through 5. It is not intended that such description be construed as limiting the scope of the invention in any way; the description of this example is merely a convenient means to become familiar with the invention. The elements of the invention may be arranged to form other embodiments and more or fewer conduits than shown in the drawings may be accommodated.

FIG. 1 depicts an exemplary processing system which will be used in describing the invention. This processing system is described fully in the previously mentioned U.S. Pat. No. 4,402,832 (Gerhold) and it is only necessary to describe herein, in order to understand the present invention, the required fluid flow arrangement and cycle, further details being available from the patent. As depicted in FIG. 1, there are six individual separation zones, or units, denoted by reference numbers 1 through 6. There are conduits carrying four fluid streams, two streams entering the processing system and two leaving the processing system (as denoted by the arrows), labeled feed, extract, desorbent, and raffinate. These four streams may be called process flows or process streams. The manner of interconnection of the separation units by means of conduits carrying several fluid streams varies in order to simulate movement of the units in a direction cocurrent with the fluid flow.

There are six steps in a complete cycle, i.e., six different interconnection arrangements to be accomplished by the valve. Two of the steps are shown in FIG. 1 and from these two, the other four steps are easily understood. As the process, or valve, is indexed through each step of the cycle, each of the labeled streams is moved to a different separation unit. The streams may be visualized to move toward the left on FIG. 1 in order to simulate movement of the separation units to the right. During step 1, feed is provided to unit 1, impure extract is removed from unit 1 and flows to unit 2, dilute extract is recycled from the outlet to the inlet of unit 3, desorbent is provided to unit 4, dilute raffinate flows from the bottom of unit 4 to the top of unit 5, and impure raffinate is recycled at unit 6, as shown in step 1 of FIG. 1. At the end of the step 1 time period, the valve indexes, or rotates, to its step 2 position, in which feed is routed to unit 6, impure extract is removed from unit 6 and routed to unit 1, and so forth, as shown in step 2 of FIG. 1. In step 2, abbreviations are used, such as IE for impure extract; their meanings are made clear by reference to the labels of step 1, referring to the first letters of the words. It can now be understood that in step 3, feed will be routed to unit 5 and corresponding changes will be made in the origins and destinations of the other streams. During step 6, feed will be routed to unit 2 and upon the next step, return to unit 1, the cycle being repeated indefinitely. The valve shown in FIGS. 3, 4, and 5 is suited to accomplish the required interconnection changes.

Figure 2:
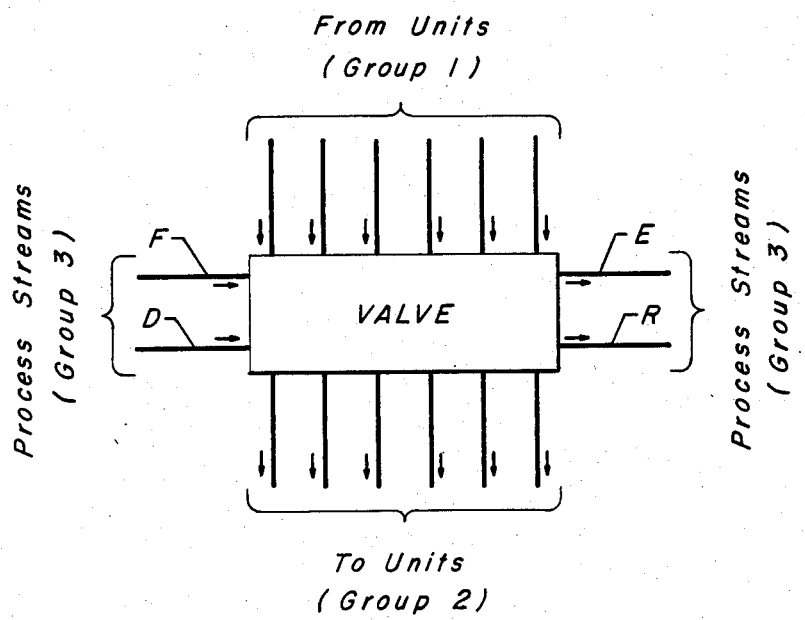
FIG. 2 is a schematic representation of a valve and conduits to be interconnected by its use as required by the process of FIG. 1.

FIG. 2 depicts the valve as a box and shows the streams of FIG. 1 as arrows entering and leaving the box. Each arrow may be viewed as a conduit, or pipeline, the direction of flow being as shown. Thus there are six conduits conveying fluid to the valve, one communicating with the outlet of each separation unit and six conduits conveying fluid away from the valve, one communicating with the inlet of each separation unit. In addition, there are four conduits to accommodate the process flows discussed above, labeled with F for feed, etc. The conduits connected to the valve may be divided into three groups: process flows, unit ins, and unit outs.

Referring to FIG. 3, stator 11, which may also be referred to as stator plate or bottom plate and which is in the form of a disc, is sealably bolted to top head 12, also called dome 12, to form the totally enclosed chamber denoted by 13, which chamber encloses the rotor. Note that as mentioned above, certain details, such as gaskets, are omitted from FIG. 3, such items being known in the art and also shown in the patents incorporated herein by reference. A further example of such an omitted detail is a packing gland or other seal at the point where the shaft 18 passes through the dome.

A fluid-tight seal is formed at the face of flange 14 of top head 12 and the flange face of stator 11 by means of a gasket or other sealing means (not shown) and studs 15 and nuts 16. Rotor 17, also referred to as rotor plate 17, has a seating surface, comprising a bottom portion of the rotor, which is in a sealing relationship to a substantially flat seating surface located on the top of stator 11. The seating surfaces are denoted by reference number 19. An interface region may be defined as those portions of the rotor and stator adjacent to the seating surfaces and including the seating surfaces and tracks (defined below). The nomenclature top and bottom, referring to the stator and rotor, is used as a result of the orientation of FIG. 3, and is not meant to limit the invention.

Rotor 17, which is in the form of a disc, is fixed to shaft 18, located in the center of the rotor plate, and rotates with shaft 18. Located above top head 12 are means (40) for turning shaft 18 which are capable of rotating the shaft, and thereby the rotor plate, in 60° increments. Such means for indexing a shaft, or rotating it in increments of usually less than a full rotation, are well known and may be characterized broadly as hydraulic, electrical, or electro-mechanical. An example of means for rotating may be found in U.S. Pat. No. 2,948,166 (Purse et al.). Instead of providing means to turn the shaft, the rotor plate may be gear-driven by a drive mechanism located at the edge of the plate.

Fluid may be added through an opening (not shown) in top head 12 so that chamber 13 is pressurized. Such pressurization aids in obtaining a seal at the seating surfaces 19 of rotor 17 and stator 11. In a similar manner, a bottom dome may be added to the valve and pressurized in order to aid in obtaining a seal. Chamber 13 also contains any leakage which may occur from the fluid-containing passages of the valve which are described below. However, use of top head 12 is not required if it is not desired or necessary to contain leakage or pressurizing fluid. There are numerous other methods of urging the seating surfaces together, or pressing the plates together, in order to form a seal, or of arranging the two plates to form a seal. An example of such a method is to use a spring or springs to urge the plates together. A collar might be added to the shaft to restrain a cylindrical spring surrounding the shaft and pressing on the top of the rotor. A plurality of springs pressing on the top of the rotor might be used, with the other ends of the springs being restrained by means affixed to the shaft or affixed to the stator.

It is now helpful to view FIGS. 3 and 4 together. FIG. 3 is taken as shown by sectional arrows 41 on FIG. 4. The letters (those without numbers) of FIGS. 3 and 4

(and also FIG. 5) correspond with the abbreviations of FIGS. 1 and 2, e.g., F denotes the feed stream. All of the conduits discussed in connection with FIGS. 1 and 2, 16 in number, are connected to stator 11, though only selected conduits are shown in FIG. 3 for the purpose of drawing clarity. There are six ports spaced around the outer periphery of the seating surface of stator 11, which constitute a first group of ports. Two of these, 28 and 38, are shown in both FIGS. 3 and 4. The other four ports can be seen only in FIG. 4, where the six ports of the first group are labeled 1T through 6T. For present purposes, a port is defined to include both an opening in the seating surface and a channel running through the stator from its seating surface to its bottom. The labels 1T through 6T refer to a particular separation unit and a particular conduit attached to that unit. For example, 1T indicates that the conduit attached to that port communicates between that port and the top of separation unit 1. In FIG. 3, conduit 27 is shown attached to stator 11 and the conduit is connected at the other end (not shown) to the top of separation unit 1, with the direction of flow indicated by arrows. The nomenclature "top" is used for convenience only because in FIG. 1, the inlets to the separating units are shown at the top of the drawing.

A second group of six ports is disposed peripherally around the stator inside the first group. In the same manner as described for the first group, there are denoted 1B through 6B, with B referring to the bottom outlets of the separation units. Ports 32 and 36 are labeled 2B and 5B. Conduit 24 is connected to the bottom, or outlet, of separation unit 2 and is representative of the other five conduits communicating between the second group of ports and the separation unit outlets, or bottoms. The location of the ports may be described as follows: the centers of that portion of each of the ports which is in the plane of the stator seating surface lie on two circles in said plane concentric with said axis of rotation and are equally spaced about each circle, or alternatively, the intersections of the ports with the stator seating surface are arranged in two circles about the axis of rotation and are equally spaced around the circumferences of the circles.

There are four concentric grooves, or tracks, formed in the seating surface of stator 11. Process fluid flows in each groove when the valve is in use. Each groove extends 360° around the seating surface, as can be seen by, for example, groove 21 of FIGS. 3 and 4. The four grooves are labeled with letters having the meanings defined above; for example, the fluid called feed is present in groove F. At one point in each groove, a passageway runs between the groove and the bottom of the stator, where a conduit of a third group is connected and communicates with the passageway. There are a total of four conduits in the third group, one for each of the process flows discussed above. These four conduits convey the process flows to and from the process system. Referring to FIG. 3, conduit 26 carries feed to its groove by means of passageway 34 and conduit 25 removes extract from its groove through passageway 30. The other two conduits and passageways are not shown in FIG. 3; but the passageways, 44 and 45, can be seen in FIG. 4.

If it were desired to add another stream, such as is mentioned above in a discussion of flushing, a groove for that stream could be located between the desorbent groove and the extract groove. It can be seen in both FIGS. 3 and 4 that sufficient space is available. Such addition would also require addition of other items, such as a passageway and crossover pipe.

FIG. 5, step 1, may be consulted in addition to FIG. 3 for the following additional description of rotor plate 17. Step 1 of FIG. 5 corresponds to the index position shown in FIG. 3. There are 16 openings in the rotor, each extending from the top to the bottom of the rotor plate. Six openings, 29, 33, 31, 35, 37, and 39, may be seen both in FIG. 3 and FIG. 5 and all of the openings are depicted in FIG. 5. An opening is defined in the same manner as a port, above. The openings may be divided into three sets corresponding with the previously discussed groups of conduits and ports. A first set of six openings is disposed about the periphery of the rotor, 29 and 39 being representative. A second set of openings is similarly disposed inside the first group, 33 and 37 being representative. At each index position of the valve, each opening of the first and second sets is located above a port of the first and second groups, i.e., is in register with a port. A third set consisting of four openings corresponds with the grooves and process flows, 31 and 35 being representative. Each opening of the third set is located so that it will always be in communication with a particular groove, regardless of rotor position. There are eight crossover pipes, such as 22 and 23 of FIGS. 3 and 5, connected to the 16 openings of the rotor, which communicate between the openings. These crossover pipes transfer fluid between openings of different groups. A crossover pipe may be any type of conduit capable of containing fluid. The crossover pipes of FIGS. 3 and 5 are marked with the fluids which pass through them in accordance with the usage explained above. Arrow 50 of FIG. 5 denotes the direction of rotation of the rotor. The labels outside the periphery of the discs of FIG. 5 (1T-6T, 1B-6B) are to be used in understanding the manner in which the rotor is in register with the stator. Each label indicates the location of a port in the stator by means of the conduit and separation unit associated with the port. For example, in step 1 of FIG. 5, 1T indicates that opening 39 is in register with port 38 of FIG. 3 and 5B indicates that opening 37 is in register with port 36 of FIG. 3.

The complete fluid transfer paths may now be understood. For example, in step 1 of the six-step cycle, feed (F) enters the process system by means of conduit 26 and flows through passageway 34 of the stator, the feed groove of the stator, opening 35 of the rotor, crossover pipe 23, rotor opening 39, stator port 38, and conduit 27 to the top, or inlet, of separation unit 1. In a similar manner, the other streams are routed in accordance with FIG. 2, step 1. In step 2 of the cycle, the rotor is indexed, or rotated, 60° to the valve index position depicted in step 2 of FIG. 5. Arrow 50 shows the direction of rotation. Just as in step 1, feed passes through conduit 26, passageway 34, the feed groove opening 35, crossover pipe 23, and opening 39. However, rotor opening 39 is now in register with a different port of the stator, the port associated with the top, or inlet, of separation unit 6, so the feed flows into unit 6. The other flows are similarly routed in accordance with step 2 of FIG. 2.

Those familiar with the design of chemical processing apparatus will appreciate that pumps and/or compressors are needed when fluids are to flow through conduits and process equipment. For example, in the Gerhold process described above, liquid may flow directly into a pump from the bottom of each separation unit.

It can be seen that there is a correspondence between the groups of conduits, groups of ports, and sets of openings according to numerical designation. Conduits of a first group of conduits communicate directly with ports of a first group of ports, which ports communicate directly with openings of a first group of openings. The same relationship exists between items described as in a second group or set. Conduits of a third group of conduits communicate directly with passageways, which passageways communicate directly with grooves, which grooves communicate directly with openings of a third set of openings. Crossover pipes communicate between openings of the three sets.

It may be necessary to place pipe expansion joints in the crossover pipes to prevent damage to the valve and/or leakage due to expansion caused by high temperature fluids flowing through the valve. An elastomeric liner located in the interface region (discussed below) and between the stator seating surface and the rotor seating surface will facilitate sealing, as discussed in the patents which have been incorporated herein by reference. A liner would cover and be affixed to one of the seating surfaces and would contain apertures, or holes, for fluid to pass through so as not to block the fluid transfer paths through the valve. The apertures would correspond to the ports, openings, passageways, and grooves. As discussed above, it might be desirable to utilize flushing fluids; one way of doing this is to add additional conduits, ports, etc., to carry and transfer the flushing fluids.

The elements of a valve may be arranged in a different manner from that of the above example without departing from the scope of the present invention. For example, the grooves may be located partially in the rotor and partially in the stator or wholly in the rotor. In this case, the openings of the rotor would comprise a portion of the grooves of the rotor.

It is convenient to define an interface region of a valve. The interface region is that portion of the rotor and stator which contains the grooves and rotor and stator seating surfaces. Thus the interface region is a discoid portion of the assembled rotor-stator assembly including the grooves and seating surface interface.

In a further example of a different arrangement, all or some of the stator ports may be disposed inside the concentric circles of the grooves, with the rotor openings arranged in a corresponding manner; that is, the grooves may be located nearer to the periphery of the interface region than the ports on some of them. This may permit use of a smaller diameter rotor and stator. In the example presented in detail herein, some or all of the ports are located nearer to the periphery of the stator than the grooves.

To illustrate valve dimensions, a stator for a valve suitable for use with six separation units having relatively high fluid flow rates can be fabricated from a 48-inch diameter forging. Two rows of 4-inch diameter ports would be located on circles of 5 11/16 and 10 7/16 inches radius with the outermost of four grooves located outside of the ports having a radius of 17 11/16 inches. Each groove would be 1 inch wide and 4 inches deep. The height of the forging would be about 10 inches. An arrangement to accommodate smaller flow rates and additional streams, such as flush streams, may have 1½ inch ports disposed about the periphery of a stator on circles of radii 14¾ and 13 inches and eight tracks located inside the ports. The tracks would be ⅝ inch wide and 1 inch deep.

A greater number of separation units than the six of the example presented herein can easily be accommodated by adding the appropriate number of ports and openings to the valve. For example, ten separation units would require rows of ten ports each disposed around the axis of rotation and index steps of 36°. In a like manner, more or less process flows can be accommodated by varying the number of grooves and associated conduits, passageways, and openings. The routing of the streams may be varied by different crossover pipe arrangements. A valve having two rows of 24 ports each has been fabricated. This will be used initially for a six separation unit system by manifolding conduits together in an appropriate manner. The purpose of providing more ports than required is to allow flexibility of application, so that the valve may be used in processing systems other than those having six separation units. This valve also has eight grooves. Where flow is recycled from the bottom of a separation unit to the top of the same unit, two tracks may be used to facilitate installation of a dedicated pump; recycle liquid flows from one track out to a pump and back to another track. In changing a particular valve from one application to another, it may be necessary to modify the rotor plate.

When a rotary valve is referred to as indexing, it is meant that the rotor is moving. A valve index position refers to one of the positions of a rotor which is stationary and where ports and openings are in register. That the stator and rotor seating surfaces are referred to as substantially flat does not preclude the surfaces from having ridges or other projections to aid in sealing, nor is a taper to facilitate sealing, such as discussed in the herein incorporated references, precluded.

The components of the present invention may be fabricated from suitable materials of construction, such as metals or plastics. Sizing of the flow channels, such as the conduits, ports, and openings, is easily accomplished by reference to any of the numerous standard methods which are available.

As used herein, the word "periphery" refers to the perimeter region of the stator and/or interface area rather than the entire external surface region.

We claim as our invention:

1. A multiport rotary valve for accomplishing the simultaneous interconnection of a plurality of conduits which are divded into a first, a second, and a third group of conduits in accordance with a previously determined cycle, where any conduit communicates with no more than one other conduit at any one valve index position, comprising:

(a) a discoid stator having said plurality of conduits connected to it, having a substantially flat seating surface, which seating surface comprises a portion of an interface region, which interface region has a plurality of grooves located concentrically about an axis of rotation, the stator further having a plurality of ports disposed in two circular rows around said axis of rotation and extending through the stator from said stator seating surface to another surface of the stator in order to communicate with a conduit, where said ports are divided into a first and a second group of ports and each port communicates with a conduit which is in a corresponding group of conduits, the number of ports being equal to the number of said conduits in said first and second groups of conduits and the stator further having a plurality of passageways, each extending from a groove through the stator to communicate with a conduit, where said passageways are equal in number to the number of grooves and each passageway communicates with a conduit of said third group of conduits;

(b) a discoid rotor having a seating surface which is in fluid-tight contact with said stator seating surface, which rotor seating surface comprises a portion of said interface region, and which rotor has a plurality of openings, each opening extending through the rotor to communicate with either a port or a groove, where said plurality of openings is equal in number to the total number of conduits and are divided into a first, a second, and a third set such that in each index position, each port of said first group in the stator is in register with a different one of the openings of said first set of rotor openings, each port of said second group in the stator is in register with a different one of the openings of said second set of rotor openings, and such that in every index position each of said grooves is in constant communication with a particular opening of said third set of rotor openings; and, (c) a plurality of crossover pipes connected to the rotor at locations other than at said rotor seating surface, where said crossover pipes complete fluid transfer paths between conduits of said first and second groups, conduits of said first and third groups, and conduits of said second and third groups in accordance with said previously determined cycle, where that part of a fluid transfer path between a conduit and a crossover pipe comprises, for said first and second groups of conduits, a port and an opening, and comprises, for said third group of conduits, a passageway, a groove, and an opening.

2. The rotary valve of claim 1 further characterized in that at least a portion of said plurality of ports are located nearer to the periphery of the stator than said concentric circular grooves.

3. The rotary valve of claim 1 further characterized in that said concentric circular grooves are formed wholly in the stator.

4. The rotary valve of claim 1 further comprising a casing in fluid-tight contact with the stator to form a chamber which encloses the rotor.

5. The rotary valve of claim 1 further comprising means for applying seating force to press the rotor and stator together.

* * * * *